United States Patent [19]
Jacobsen et al.

[11] Patent Number: 5,566,866
[45] Date of Patent: Oct. 22, 1996

[54] COMBINATION PORT FOR SURFACE CRACK FILLING

[76] Inventors: Kenneth H. Jacobsen, 921 N. Quentin Rd., Palatine, Ill. 60067; Louis F. Cole, 21233 Silk Tree Cir., Plainfield, Ill. 60544

[21] Appl. No.: 503,836

[22] Filed: Jul. 18, 1995

Related U.S. Application Data

[63] Continuation-in-part of Ser. No. 154,625, Nov. 18, 1993, Pat. No. 5,433,354.

[51] Int. Cl.⁶ ........................... B65D 5/72
[52] U.S. Cl. .................. 222/495; 222/575; 401/266; 425/12; 425/87
[58] Field of Search ................ 222/495, 559, 222/575; 401/107, 193, 266; 425/87, 12, 13; 156/94; 285/921

[56] References Cited

U.S. PATENT DOCUMENTS

| | | | |
|---|---|---|---|
| 2,300,398 | 11/1942 | Ames | 425/87 |
| 3,087,654 | 4/1963 | Moore | 222/575 |
| 4,047,497 | 9/1977 | Grobler | 425/13 |
| 4,570,834 | 2/1986 | Ward | 222/575 |
| 4,961,883 | 10/1990 | Jacino et al. | 425/13 |
| 5,018,555 | 5/1991 | Sweeney | 285/921 |
| 5,433,354 | 7/1995 | Jacobsen et al. | 222/495 |

FOREIGN PATENT DOCUMENTS

| | | | |
|---|---|---|---|
| 423546 | 5/1967 | Switzerland | 401/266 |

Primary Examiner—Andres Kashnikow
Assistant Examiner—Philippe Derakshani
Attorney, Agent, or Firm—Charles F. Lind

[57] ABSTRACT

The disclosed port device has a tubular inlet end stepped with progressively smaller land areas sized to establish a leakproof separable joint with outer land areas of conventional material mixing/dispensing tubes. Separate radial base blades hinged from the port device near its outlet end fit either unfolded flush against a flat surface aligned over a crack therein or back-folded into the crack itself, for alternative uses of the port device. The port device beyond the base is beveled across end edges, for cooperating with corner surfaces and guiding material discharge under pressure into an underlying corner crack, where two partly folded base blades can then fit flush against the corner surfaces. An expandable sleeve fitted into the structure crack can be deformed radially upon tightening a nut for retaining the port device in the structure even when dispensing material under high pressures into the crack, as by an accessory fitting mechanically locked to the port device. Another accessory fitting having interior and exterior stepped land areas sized the same as the material tubes and port device land areas, and the inner bore and exterior surfaces of conventional flexible hoses, provide for the remote interconnection of the material tube and port device via such hoses of virtually any length.

12 Claims, 4 Drawing Sheets

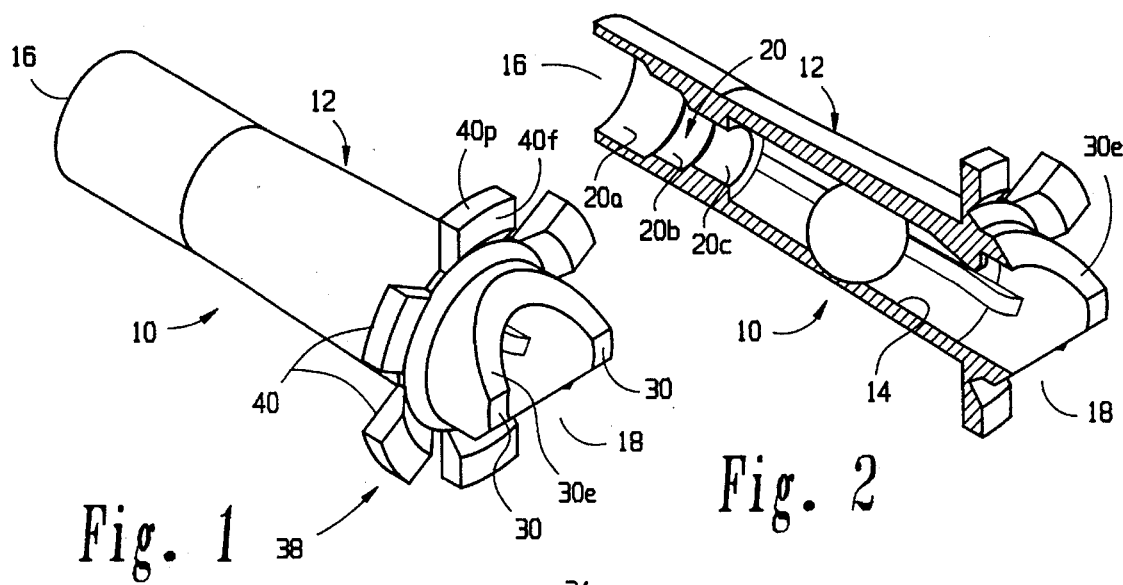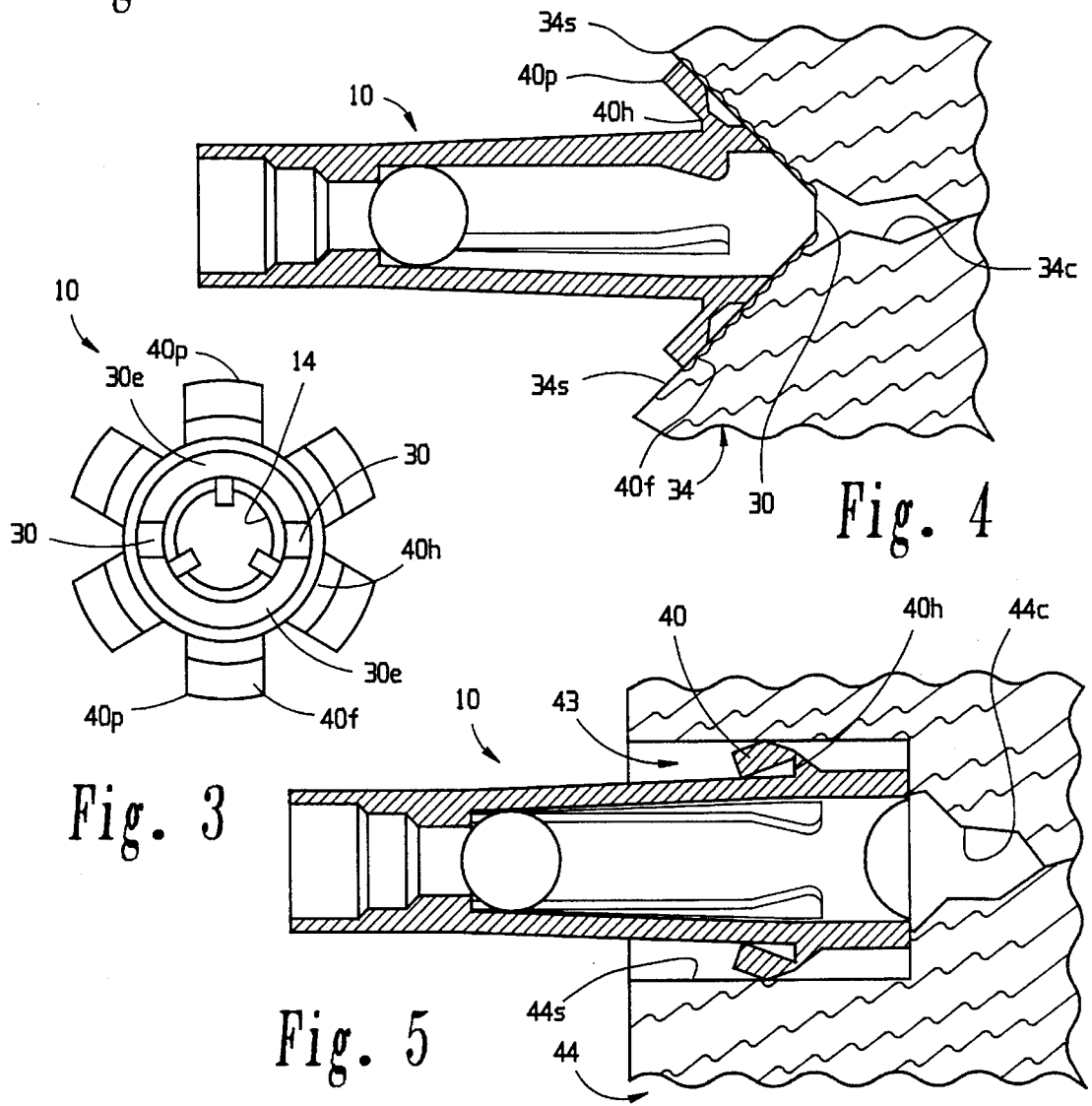

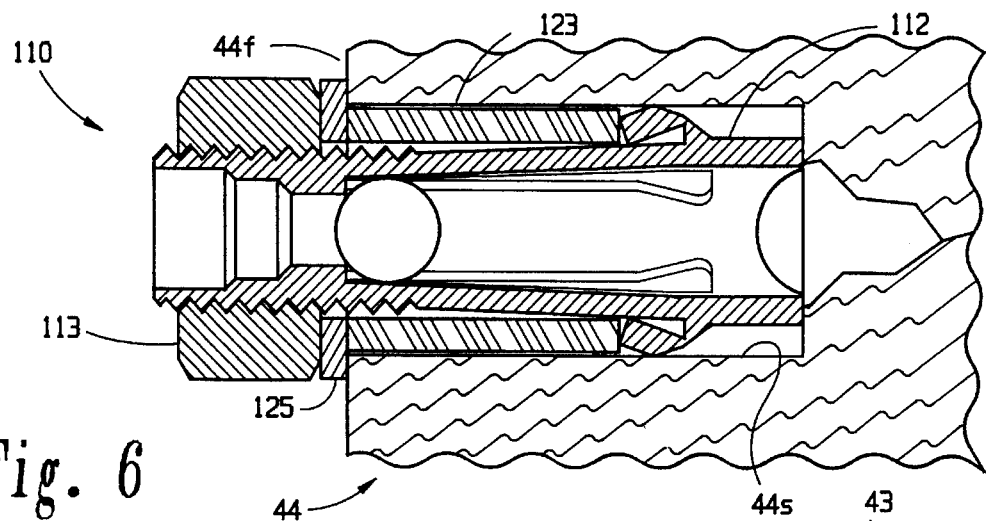
Fig. 6
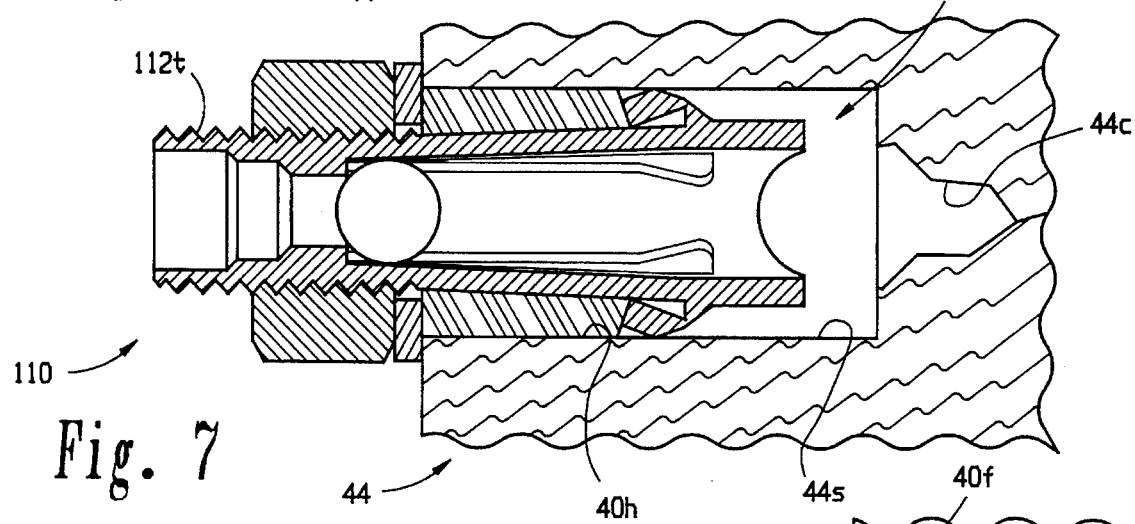
Fig. 7
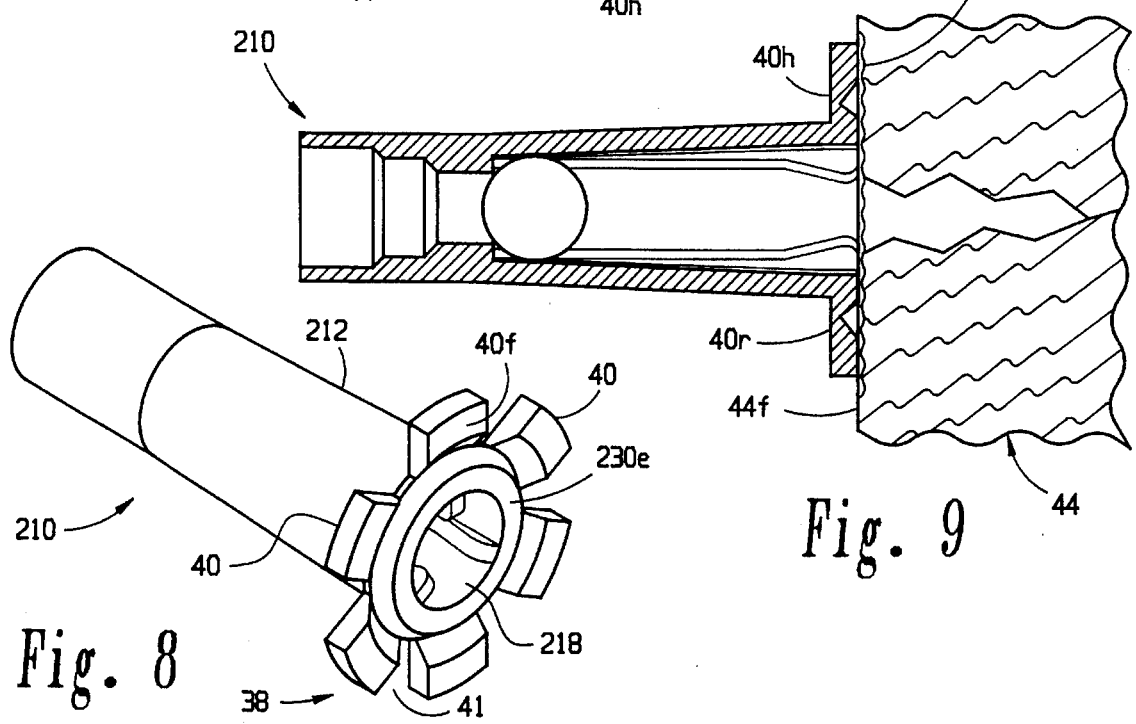
Fig. 8
Fig. 9

COMBINATION PORT FOR SURFACE CRACK FILLING

RELATED APPLICATION

This is a continuation-in-part application of our application filed Nov. 18, 1993 and having Ser. No. 08/154,625 now U.S. Pat. No. 5,433,354, and identified as SURFACE PORT FOR CRACK FILLING.

FIELD OF THE INVENTION

This invention relates to a port device usable for dispensing fluid material(s) via conventional dispensing outlet nozzle(s) directly into a surface crack of a structure, such as concrete floors, walls or ceilings.

BACKGROUND OF THE INVENTION

Caulk, adhesive, potting material and other fluid systems are commonly contained in tubular cartridges of the type having an outlet nozzle at one end and an opposite open end that is closed by a wiper slidably seated against the inside face of the cartridge wall. The material is discharged from the outlet nozzle by advancing the wiper through the cartridge toward the nozzle. Available dispensing tools utilize a plunger connected to a rod, and a power device that forces the rod and plunger axially into the open cartridge end and against the wiper. Many dispensing tools are hand held and portable, where the power device is a ratchet mechanism indexed incrementally upon manual trigger squeezes.

Single component fluid systems use only one material cartridge, the material being discharged therefrom via an elongated dispensing tube having the outlet nozzle at its downstream end. Multiple component fluid systems use different material cartridges from which the materials are simultaneously discharged in the precise ratio needed to form the intended composite material, the discharged materials being blended together in an elongated mixing/dispensing tube before being discharged as the composite material from the outlet end of the dispensing tube. Common multiple component materials include two-part epoxies, urethanes, silicones, phenolics, acrylics and polyesters.

Component fluid systems have been successfully used for filling surface cracks in concrete structures to restore structural integrity. Special conduit routing structures can be fitted over the outlet end of the dispensing tube for more accurately directing the discharged material to the intended region of use. One such routing structure is a surface port device, which is in the form of a tube having at the outlet end an enlarged flat base that can be bonded by adhesive to the structural surface with the tube bore aligned over a surface crack. The material dispensing tube is then seated against the inlet end of the tube to funnel the discharged material via the surface port device directly into the underlying crack.

Our U.S. Pat. No. 5,263,614 issued on Nov. 23, 1993 discloses manual dispensing tools having spring linkages between the power device and each driven plunger for storing and dissipating unused energy inputted to the power device for maintaining substantially continuous forces on the plunger even between successive trigger squeezes. This overcomes many problems that can occur when discharging an incompressible material with an incrementally actuated power device.

Our U.S. Pat. No. 5,314,092 issued on May 24, 1994 discloses a specific dispensing tool plunger having a shiftable O-ring for providing a sealing-venting action to minimize leakage past the wiper and plunger when discharging the material, while allowing the plunger to be removed from the emptied cartridge for reuse.

Our U.S. Pat. No. 5,433,354 issued on Jul. 18, 1995 from copending application Ser. No. 08/154,625 filed Nov. 18, 1993 discloses a port device for funneling material into a surface crack, the port device having great universality to operate effectively with many different types and sizes of dispensing tubes and outlet nozzles used in dispensing fluid material(s) from tubular cartridge(s), while maintaining a leakproof seated fit between the dispensing tube outlet nozzle and port device inlet, and possibly even without the need for physically holding these seated components together with any significant force.

Our patented port device had a tube with its inlet end stepped at adjacent axially extended inner land areas of progressively smaller diameters in the direction toward the outlet end, these land areas being sized so that at least one would snuggly receive at least one of the outer land areas provided on the different dispensing nozzles and/or tubes. These components when telescoped together establish the substantially leakproof and mechanically constrained connection for conveying the dispensed material. The flat base at the outlet end of the port device had side edges that could be flexed out of the flat, to position the device more closely adjacent an interior structural corner for directing material accurately into the corner.

One problem yet exists with this port device, specifically when attempting to provide material discharge relative to a structural corner, be it into an interior structural corner or onto an exterior structural corner. As such, the dispensing outlet is spaced from the structural corner and the discharged material merely oozes between the structures of the surface and port device, with little or no pressure built-up forcing the material into any underlying crack. Also, this port device cannot be used with high pressure material discharges, as only limited bonding areas exist between the flat base and structural surface, whereby excessive pressures merely blows the port device off of the surface even when bonded thereto. In order to provide such high pressure cracking, a hole would be drilled in the structure communicating with the underlying crack and a different type of dispensing tube would be driven into the hole to establish a stronger mechanical connection between the tube and structure, suited to withstand the forces of the dispensed high pressure materials.

Still another problem with this port device is that even though it satisfies the universality of fitting with most dispensing tubes of different commercially available material cartridges and from different suppliers, this mode of cooperation yet requires the user to hold the dispensing tool close to and connected to the port device. As the fill rate of most cracks commonly is slow to provide deep material penatration into the crack rather than just along the structural surface, the time to complete a crack could involve a relatively long time, making it difficult without tiring to hold the tool properly in place.

SUMMARY OF THE INVENTION

This invention improves on the port devices that can universal establish a leakproof seated connection with many different types and sizes of dispensing tubes and nozzles used in dispensing fluid material from cartridges, for dispensing the material into cracks in underlying structures.

A basic object of this invention is to provide a port device suited for dispensing fluid material relative to a crack adjacent either interior or exterior structural corners, with the material being substantially and accurately guided and constrained to flow accurately and under pressure into the crack.

Another object of this invention is to provide a port device that can be used for dispensing fluid material into the crack, with great universality under different modes of use including being bonded to the structure adjacent an interior corner thereof, being fitted and retained in a drilled hole or crack in the structure, and/or being bonded flush to an exterior flat surface of the structure.

Yet another object of this invention is to provide a port device that can be used for dispensing material under very high pressure, being fitted into a drilled hole in the structure and communicating with a crack therein and being then manually secured and sealed relative to the structure suited to withstand blow-out from the structure.

A further object of this invention is to provide accessory fittings that complement the universality of the port device, allowing for the operative connection between the material dispensing tube and port device via flexible hoses of virtually any needed length, suited to allow controlled fluid material dispensing into cracks at variable distances and orientations from the dispensing tube and eliminating the need for the user to hold the dispensing tool close to and connected to the port device.

BRIEF DESCRIPTION OF THE DRAWINGS

These and further objects, advantages and features of the present invention will be understood and appreciated upon reviewing the following disclosure, including as a part thereof the accompanying drawings, in which:

FIG. 1 is a perspective view of an improved port device, as seen from the outlet end thereof;

FIG. 2 is a centered sectional view of the port device;

FIG. 3 is an elevational view of port device from the outlet end;

FIG. 4 is a sectional view of the port operatively in place at an interior right angle corner between meeting structural surfaces, illustrating one mode of use;

FIG. 5 is a sectional view of the port operatively in place in a drilled bore in a structural member, illustrating another mode of use;

FIGS. 6 and 7 are sectional views of the port device illustrated respectively in an assembly stage and then operatively sealed in place in a drilled bore in a structural member, illustrating yet another mode of use;

FIG. 8 is a perspective view similar to FIG. 1, except of another embodiment of port device;

FIG. 9 is a sectional view of the port device of FIG. 8 used on a flat surface over a crack therein;

DETAILED DESCRIPTION OF PREFERRED EMBODIMENTS

Figure 10:
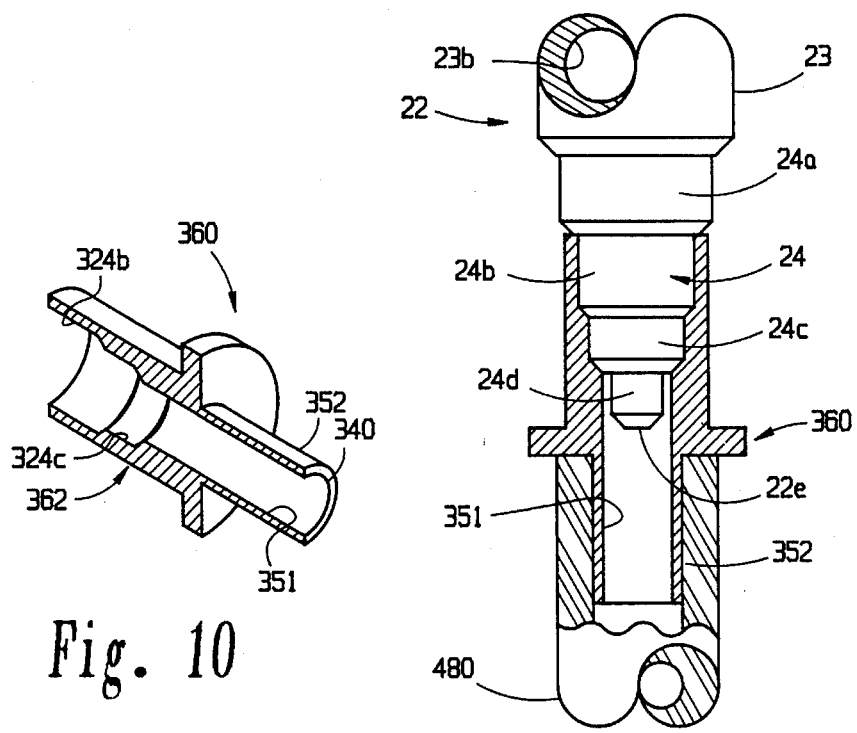
FIG. 10 is a broken away perspective sectional view and FIG. 11 is a perspective view of different accessory fittings.
Figure 11:
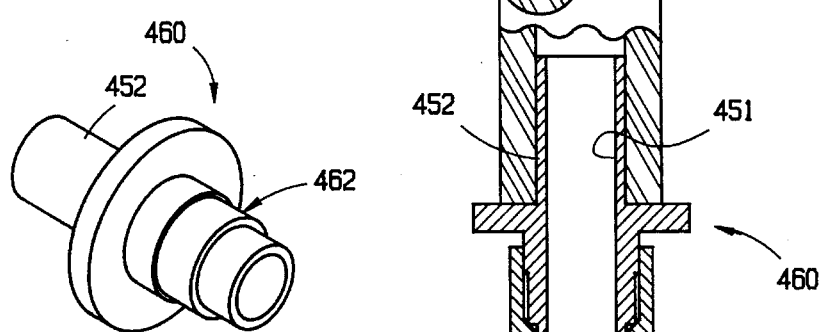

A preferred embodiment of the improved surface port device 10 is illustrated alone in FIGS. 1, 2 and 3. The surface port device 10 is in the form of a tube 12 having a throughbore 14 between inlet end 16 and outlet end 18. The bore at the inlet end 16 has a stepped region 20, having three axially adjacent generally cylindrical inner diameter land areas 20a, 20b, and 20c of progressively smaller diameters in moving downstream toward the outlet end 18.

This stepped region 20 is disclosed specifically in our patent U.S. Pat. No. 5,433,354, and provides universality in snuggly cooperating with many different types and sizes of dispensing tubes and outlet nozzles used in dispensing fluid material (s) from tubular cartridge(s), and in thereby establishing a leakproof seated connection between the dispensing tube outlet nozzle and port device inlet.

Specifically, the diameter of the dispensing tubes vary, depending on the brand or supplier, and depending on the material being dispensed, its viscosity and needed rate of mixing and volume of discharge. Thus, mixing tubes for multiple component systems typically might be of ¼, ⅜ or ½ inch inner diameter or I.D. and (because of the wall thickness of the tube) a correspondingly larger outer diameter or O.D., and the outlet nozzle end of each such tube might be configurated as three, four or five smaller stepped cylindrical outer diameter nose sections.

Figure 12:
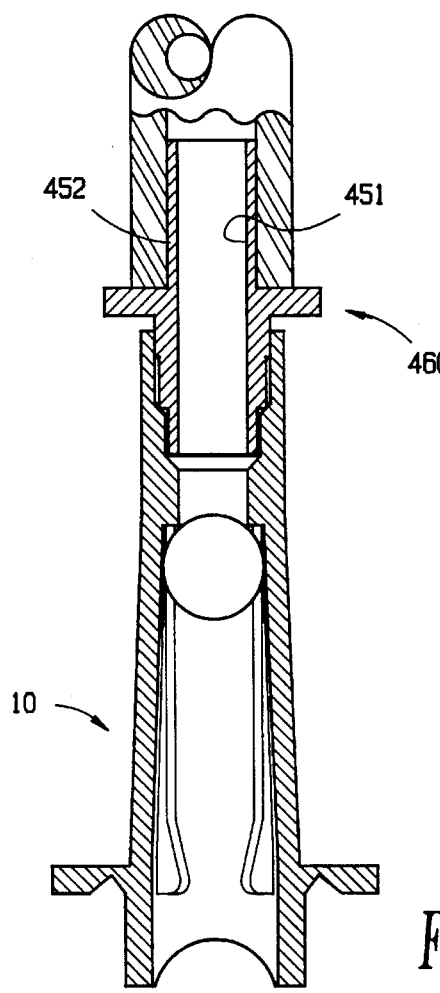
FIG. 12 is a sectional view of these fittings illustrated in an operative connection with the port device.
Figure 13:
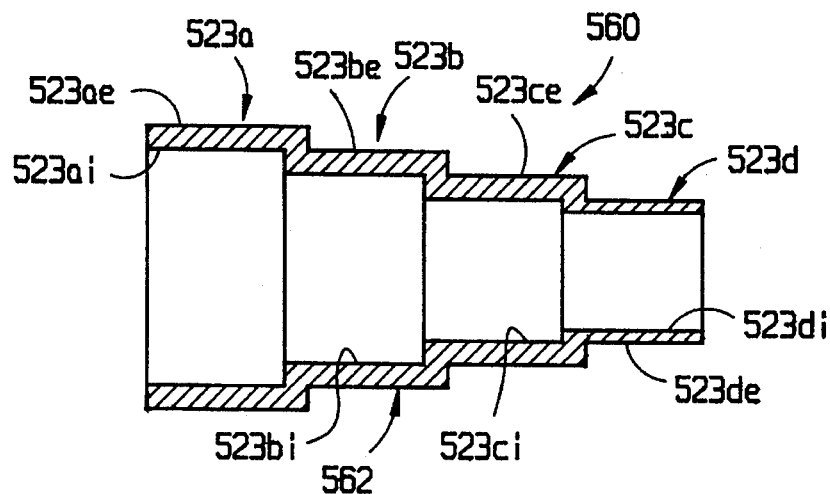
FIG. 13 is a centered sectional view of yet another embodiment of an accessory fitting usable with the surface port and dispensing tubes disclosed herein.
Figure 14:
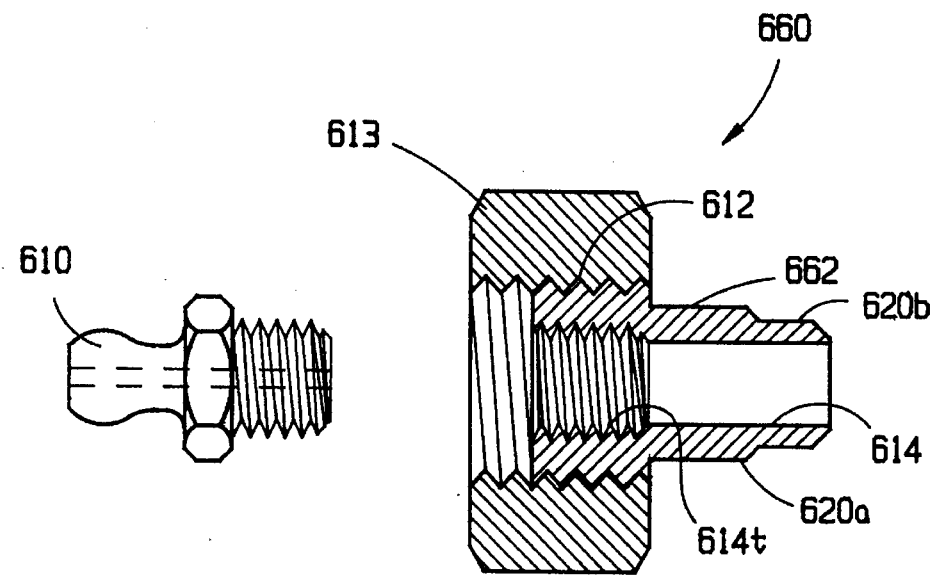
FIG. 14 is a centered section view of yet another embodiment of an accessory fitting usable with a high pressure conventional fitting (shown disassemblied from the fitting) and the surface port disclosed, particularly in FIGS. 6 and 7.

By way of example, a representative mixing/dispensing tube 22 commonly available for use in a multiple component fluid system is illustrated in FIG. 12, having a main tube portion 23 with an outer diameter and an inner bore 23b, and having a stepped nose 24 consisting of four cylindrical outer diameter land areas 24a, 24b, 24c and 24d progressively smaller toward the outlet end 22e. A stepped throughbore (not shown but commonly progressively smaller toward the outlet end) extends through the stepped nose to an opening at outlet end 22e. The port stepped region 20 is sized to snuggly receive at least one of these stepped areas of the nose section 24.

By way of specific example, on the port device 10, the land area 20a can be of substantially 0.375 inch inner diameter with an axial length of substantially 0.185 inch, the land area 20b can be of substantially 0.25 inch inner diameter with an axial length of substantially 0.125 inch, and the land area 20c can be of substantially 0.165 inch inner diameter.

Going now to the first improvement taught herein, the outlet end 18 of the port device tube 12 is beveled from opposite centered high points 30, forming with the tube end edges 30e a substantially right angle exterior corner suited to be fitted snuggly into an interior corner of structure 34 (FIG. 4) while having the tube edges 30e substantially flush against the structure's corner surfaces 34s. The material would be discharged directly into crack 34c in the structure, and the cooperation between the tube end edges and corner surfaces provides more complete material delivery and pressure build-up in the crack, without material waste or needed operator skill level.

Further, at right angles to and between the opposite centered high points 30 (see FIGS. 5, 6 and 7), the side edges form a concave curve 37 that can be positioned over an exterior right angle structural corner (not shown), establishing close cooperation between the inside end edges 37e of the tube 12 at the angled outlet end 18, and the structure's surfaces at the exterior corner. Again, this allows for more complete and accurate material delivery to and build-up in any crack at the exterior corner.

A mounting base 38 is formed on the tube 12 closely adjacent the outlet end 18, the base being comprised of separate radial blades 40 circumferentially disposed around the tube, and supported from the tube across generally circumferential hinged regions 40h. The blades are generally of rectangular shape, to be folded back to lie against the outside of the tube without having side edges of adjacent blades bind against one another. Six blades are illustrated, and the hinged regions of opposed blades 40p preferably are substantially parallel to a line across the tube high points 30. This provides that when the tube edges 30e are seated in interior corner (see FIG. 4), the blades will be flexed until the faces 40f of the blades 40p adjacent the tube outlet 18 line up substantially flush against the structural corner surfaces 34s, allowing sound adhesive bonding if desired between the blade faces of the seated port device 10 and its retention relative to the structure 34.

The illustrated port device 10 further can effectively be used in a hole 43 drilled in a structure 44, to reach a crack 44c therein (see FIG. 5). In this situation, all of the port device blades 40 and 40p can be folded back to lie against the tube 12, biased thereagainst by the binding fit against the surface 44s of the drilled hole.

A port device 110 differing from the port device 10 only slightly can effectively be used for high pressure injection of material into the drilled hole 43 in a structure 44 and into crack 44c therein (see FIGS. 6 and 7). One difference might be that the exterior of tube 112 would be threaded to accept nut 113, although this might not be needed even with a self-threading nut (but its holding capacity might limit its use to only lower pressures). Further, a resilient sleeve 123 of rubber or plastic would be fitted over the tube 112, sized to fit into the hole 43 and extended axially only part way along the tube to the threaded region 112T, and a washer 125 and nut 113 would be fitted over the tube inlet end. The tube and sleeve would be fitted into the hole 43 until the washer 125 and nut 113 are generally solid against the structure face 44f, whereupon the nut could be tightened onto the tube at the threaded region 112T to withdraw the tube slightly and axially compress the sleeve and expand it tightly against the hole surfaces 44s. This would withstand high discharging material pressures in excess of 1,000 psi.

Another port device 210 differing from the port device 10 only slightly can effectively be used for flat surfaces 44f of the structure 44 (see FIGS. 8 and 9). In this port device 210, the outlet end 218 of the port device tube 212 is not beveled but has a flat annular seat 230e, although its base mounting 38 is the same with separate radial blades 40 circumferentially disposed around the tube supported from the tube across generally circumferential hinged regions 40h, and the blade surfaces 40f would line up with the flat annular seat 230e. This provides for effective cooperation with the flat structure surface 44f. Also, adhesive can lie between the seated adjacent surfaces 44f and 230e, and it further can be squeezed between the blades 40 into the pie-shaped spaces 41 between the blades and overlie the rear faces 40r, thereby increasing the holding securement between the port device and flat structure surface 44f.

This universality of the port device is further enhanced by fittings 360, 460, 560 and 660 (see FIGS. 10, 11, 13 and 14 respectively).

Each fitting has a tube 362, 462, 562 and 662 with either or both interior and/or exterior stepped land areas, for receipt of and cooperation with the land areas of dispensing tubes and/or port devices. This is illustrated by stepped inner diameter land areas 324b, and 234c in FIG. 10 suited to correspond with land areas 24b and 24c on a representative nose 24 of a dispensing tube 22; and by stepped outer diameter land areas 420a, and 420b in FIG. 11 suited to correspond with land areas 20b and 20c of port device 10. Each opposite tube end at 340 and 440 is generally cylindrical, both inside and outside, to serve as a telescoping receiver of standard flexible hose commonly used in this industry. Thus, common flexible hose even of different diameters would have related inner and outer diameters; and the opposite tube ends 340 and 440 would have an inner diameter bore to receive the outer diameter of one hose size and an outer diameter land area to fit into the inner diameter of another hose size. Specifically, ⅜" and ½" hoses are common and the outer diameter of the ⅜" hose is the same as the inner diameter of the ½" hose, and the respective inner bores 351 and 451 would be the same for both as would the outer diameter area 352 and 452.

Thus, the fittings 360 and 460 could be interconnected by a flexible hose 480, snugged onto the outer diameter land areas 352 and 452; while the fitting 360 can further be seated onto the dispensing tube 22 and the fitting 460 can further be seated in the port device 10. This mode of cooperation allows the user to separate the port and material cartridge components from one another, eliminating the need to hold the dispensing tool and cartridge near the port device, for improved ease and efficiency of crack filling.

The tube 562 of fitting 560 has four stepped land areas 523a, 523b, 523c and 523d, and each has both outer and inner stepped land areas. The specific exterior or outer land areas (and the diameters) would be 523ae (⅝"), 523be (½"), 523ce (⅜") and 523de (⁵⁄₁₆"), and its inner land areas (and the diameters) would be 523ai (½"), 523bi (⅜"), 523ci (¼") and 523di (³⁄₁₆"). This allows the inner land areas to be positioned over the exterior or outer land areas (as at 23 in FIG. 12) of the tube itself, with as much axial length of each as needed for firm retention.

The tube 662 of fitting 660 has two stepped outer land areas 620a and 620b to correspond to the inner land areas 20a and 120b of the port device 10 (and 110 with its exterior threaded region 112t). A throughbore 614 accepts a threaded pressure fitting 610 of conventional design, possibly being threaded at 614t for this purpose. The exterior of fitting tube 662 is threaded at 612 to accept nut 613. The outer land areas 620a and 620b would be inserted into the inner land areas 20a and 20b of the port device 10 (and 110 with its exterior threaded region 112t) and the nut would fit and be threaded over both the threaded portions 612 and 112t, for sound retention. As is known in the trade, the pressure fitting 110 is useful in delivering material under pressures in excess of 1000 psi and to this extent the fitting and surface port 110 might be used with the sleeve 123 and seating washer 125 of FIGS. 6 and 7.

Details of construction not given herein, are disclosed in our above-mentioned U.S. Pat. No. 5,433,354. This could include the check ball "B" held captive in the tube bore 14.

While only specific embodiments of the invention have been illustrated, it is apparent that variations maybe made therefrom without departing from the inventive concept. Accordingly, the invention is to be limited only by the scope of the following claims.

What we claim as our invention is:

1. A port device for funneling material into a surface crack, comprising the combination of a tube having a throughbore between its inlet and outlet ends, and a base at the outlet end suited to be bonded by adhesive to the surface with the tube throughbore aligned over the crack therein;

the tube at the inlet end being stepped, as several adjacent generally cylindrical axially extended inner diameter land areas of progressively smaller diameters in moving downstream toward the outlet end, suited to correspond to at least one and generally only one set of outer diameter land areas of conventional universally available but differently sized material mixing/dispensing tubes, operable when snugged together to establish a leakproof separable joint between the mixing/dispensing tube and the port device; and the outlet tube end being beveled from opposite centered high points, forming end edges lying on a substantially right angle exterior corner, suited to be snugged substantially flush against surfaces of a structure at an interior corner.

2. A port device according to the combination of claim 1, further comprising the base having separate radial blades circumferentially spaced around the tube and connected at circumferential hinge regions from the tube, suited to be flexed at the hinge regions and be folded back against the tube.

3. A port device according to the combination of claim 2, further comprising two opposed radial blades having their hinge regions disposed substantially parallel to a line through said opposite centered high points, and having faces thereon suited to lie substantially flush against the structural surfaces at the interior corner when the tube end edges are snugged against structure surfaces at the corner.

4. A port device for funneling material into a surface crack, comprising the combination of a tube having a throughbore between its inlet and outlet ends;

the tube at the inlet end being stepped, as several adjacent generally cylindrical axially extended inner diameter land areas of progressively smaller diameters in moving downstream toward the outlet end, suited to correspond to at least one set of outer diameter land areas of conventional universally available material mixing/dispensing tubes, operable when the corresponding land areas are snugged together to establish a leakproof separable joint between the mixing/dispensing tube and the port device;

the tube near the outlet end having a base comprised of separate radial blades circumferentially spaced around the tube and connected at circumferential hinge regions from the tube, the blades being shaped to have spaced apart side edges allowing the blades to be folded back against the tube without binding against one another, and the blades defining faces that lie when the blades are radial and unfolded along a plane generally normal to the tube; and the port device being alternatively suited to fit with the unfolded blade faces substantially flush against for bonding by adhesive to a flat surface with the tube throughbore aligned over the crack therein, or to fit with the back-folded blade faces defining a compact exterior into and be retained within a drilled somewhat cylindrical hole or a crack in the structure.

5. A port device according to the combination of claim 4, further comprising two of the radial blades being on opposite sides of the tube, the outlet tube end being beyond the base and being beveled to form end edges lying on a substantially right angle exterior corner, the beveled end edges extending from opposite high points at the tube center to low points adjacent the hinge regions of the two radial blades, and the two high points and the two hinge regions all being disposed substantially parallel to one another, suited to have the beveled end edges snugged substantially flush against the surfaces of an interior structural corner allowing substantially constrained fluid material flow accurately and under pressure into an underlying crack at or adjacent the corner and the two radial blades being partly folded with the faces thereon substantially flush against for bonding by adhesive to the surfaces of the structural corner.

6. A port device according to the combination of claim 5, further comprising the beveled outlet tube end edges along the throughbore curving concave between the centered high points suited to be positioned over an exterior right angle structural corner and to lie closely adjacent the surfaces thereof, allowing substantially constrained accurate fluid material flow under pressure into an underlying crack at or adjacent the exterior corner.

7. A port device according to the combination of claim 4, further comprising the outlet tube end having a flat annular seat and said blades faces lying when the blades are radial and unfolded along a plane generally normal to the tube and parallel to and lined up with the flat annular seat.

8. A port device according to the combination of claim 4, further comprising means for holding the port device mechanically retained in place in the structure for dispensing material under very high pressure into the hole or crack, said means including a threaded nut and having the tube exterior near the inlet end suited to accept said nut, an expandable member fitted over the tube and normally sized to fit into the hole or crack and extend axially along the tube between the base and nut, operable upon the tube and member being fitted into the hole or crack until the nut is restrained against the structure surface and upon nut tightening on the tube for expanding the member radially against the retaining hole or crack surfaces.

9. A port device according to the combination of claim 8, further comprising a tubular fitting having an outer land area sized to correspond to the largest inner land area of the port device operable to establish a leakproof separable joint therebetween, the fitting having means for accepting material flow under high pressures and for communicating same to the tube throughbore, and a nut sized to thread simultaneously onto the exteriors of the fitting and tube to mechanically connect them together.

10. A port device according to the combination of claim 4, further comprising a tubular fitting having generally cylindrical interior and exterior stepped land areas selectively sized the same as cooperating outer land areas of conventional dispensing tubes, the inner land areas of the port device, and inner bore and exterior surfaces of conventionally sized flexible hoses, operable for connecting the dispensing tube and port device via flexible hose of virtually any length and dispensing material between tube and port device without holding the dispensing tool fixedly relative to the port device.

11. A port device according to the combination of claim 10, further comprising the use of outer land areas sized of the order of 5/8", 1/2", 3/8" or 5/16" and inner land areas sized of the order of 1/2", 3/8", 1/4" or 3/16", allowing the inner land areas to be positioned over the outer land areas of the dispensing tube itself and selectively with an appropriate 3/8", 1/2" or 5/8" flexible hose.

12. A port device according to the combination of claim 4, further comprising a pair of tubular fittings respectively having one end defined with either generally cylindrical interior or exterior stepped land areas selectively sized the same respectively as the outer land areas of the mixing/dispensing tube or the inner land areas of the port device, operable when the respective corresponding land areas are snugged together to establish leakproof separable joints respectively between the fittings and the mixing/dispensing tube or the port device, and the, opposite end of each tubular fitting having a generally cylindrical land area sized the same as the axial land area of a conventionally sized flexible hose, operable for connecting said hose of virtually any length between and to the tube and port device for dispensing material via the hose between the tube and port device and without holding the dispensing tool fixedly relative to the port device.

* * * * *